United States Patent
Ostheeren et al.

(10) Patent No.: US 10,623,927 B2
(45) Date of Patent: Apr. 14, 2020

(54) METHOD FOR DOWNLOADING A SUBSCRIPTION TO AN IDENTIFICATION UNIT

(71) Applicant: Gemalto M2M GmbH, Munich (DE)

(72) Inventors: Andre Ostheeren, Gemenos (FR); Volker Breuer, Boetzow (DE); Thomas Ulrich, Bad Dürkheim (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 202 days.

(21) Appl. No.: 15/510,925

(22) PCT Filed: Sep. 1, 2015

(86) PCT No.: PCT/EP2015/069910
§ 371 (c)(1),
(2) Date: Mar. 13, 2017

(87) PCT Pub. No.: WO2016/041769
PCT Pub. Date: Mar. 24, 2016

(65) Prior Publication Data
US 2017/0251327 A1    Aug. 31, 2017

(30) Foreign Application Priority Data
Sep. 15, 2014    (EP) .................... 14184778

(51) Int. Cl.
*H04W 4/50* (2018.01)
*H04W 8/20* (2009.01)
(Continued)

(52) U.S. Cl.
CPC .............. *H04W 4/50* (2018.02); *H04W 4/60* (2018.02); *H04W 8/205* (2013.01);
(Continued)

(58) Field of Classification Search
CPC ....... H04W 12/04; H04W 12/06; H04W 4/50; H04W 4/60; H04W 4/70; H04W 88/02
See application file for complete search history.

(56) References Cited

U.S. PATENT DOCUMENTS

| | | | |
|---|---|---|---|
| 2011/0214121 A1 | 9/2011 | Gentile et al. | |
| 2013/0157673 A1 | 6/2013 | Brusilovsky | |
| 2017/0251327 A1 | 8/2017 | Ostheeren et al. | |

FOREIGN PATENT DOCUMENTS

| | | |
|---|---|---|
| EP | 2 538 707 A1 | 12/2012 |
| EP | 2 747 466 A1 | 6/2014 |

(Continued)

OTHER PUBLICATIONS

International Search Report (PCT/ISA/210) dated Oct. 30, 2015, by the European Patent Office as the International Searching Authority for International Application No. PCT/EP2015/069910.
(Continued)

*Primary Examiner* — Sam Bhattacharya
(74) *Attorney, Agent, or Firm* — Buchanan Ingersoll & Rooney PC

(57) ABSTRACT

In a method for downloading subscription information to an identification unit connected to a wireless communication device operating within a cellular network, which includes at least one packet gateway node and a remote provisioning server being connected to it, the wireless communication device operates in a mode with limited access to the remote provisioning server. The method includes submitting a request comprising an authentication identifier and access information relating to one remote provisioning server from the identification unit on an assigned communication channel to the cellular network, forwarding at the cellular network said request using a connection tunnel preconfigured according to said access information from the packet gateway node to the remote provisioning server addressed by (Continued)

said access information, and providing a response message comprising data relative to subscription information through said preconfigured connection tunnel to the identification unit, when subscription information is detected.

15 Claims, 4 Drawing Sheets

(51) Int. Cl.
*H04W 12/04* (2009.01)
*H04W 12/06* (2009.01)
*H04W 4/60* (2018.01)
*H04W 12/00* (2009.01)
*H04W 4/70* (2018.01)
*H04W 88/02* (2009.01)

(52) U.S. Cl.
CPC ....... *H04W 12/0023* (2019.01); *H04W 12/04* (2013.01); *H04W 12/06* (2013.01); *H04W 4/70* (2018.02); *H04W 88/02* (2013.01)

(56) References Cited

FOREIGN PATENT DOCUMENTS

| | | |
|---|---|---|
| JP | 2017-528087 A | 9/2017 |
| KR | 10-2010-0095648 A | 8/2010 |
| WO | 2009082759 A1 | 7/2009 |
| WO | WO 2013/039900 A1 | 3/2013 |

OTHER PUBLICATIONS

Written Opinion (PCT/ISA/237) dated Oct. 30, 2015, by the European Patent Office as the International Searching Authority for International Application No. PCT/EP2015/069910.

Notification of Reason for Refusal dated Apr. 9, 2018 in corresponding to Korean Application No. 10-2017-7009923 with English Translation (13 pages).

Non-Final Office Action dated Aug. 22, 2019 cited in the related U.S. Appl. No. 16/240,364 (10 Pages).

Office Action (Notice of Reasons for Rejection) dated Oct. 8, 2019, by the Japanese Patent Office in corresponding Japanese Patent Application No. 2018-159878 and English translation of the Office Action. (7 pages).

METHOD FOR DOWNLOADING A SUBSCRIPTION TO AN IDENTIFICATION UNIT

FIELD OF THE INVENTION

The present invention relates to a method for downloading a subscription to an identification unit embedded in a wireless communication device.

The invention also pertains to a cellular network for using said method. Further the invention relates to a system for downloading subscription information to an identification unit.

BACKGROUND OF THE INVENTION

Generally, it is known in nowadays cellular wireless communication technology that wireless communication devices operated within a cellular network provide at least one embedded identification unit. Those identification units are equipped with all those information allowing the wireless communication device to authenticate at cellular networks, which the user is authorized to work with.

With respect to allowing more flexibility, there are firstly concepts known to modify the information stored in the identification unit, without having to go to a service point of a cellular network operator, in particular the home cellular network, which is the cellular network serving the current subscription of the wireless communication device. This is in particular useful for users travelling through areas being covered by different cellular network operators. This is further of high importance for machine-type communication, also known as machine-to-machine or M2M communication, where the wireless communication device is or is part of a machine, which in certain use cases is not even capable to be moved. Here differences in coverage, tariff structure or overall contractual changes for a plurality of wireless communication devices lead to the need to quickly change subscriptions for the assigned set of devices.

Those methods are known under the name remote provisioning. The main task of remote provisioning procedures consists of the downloading of subscription information from a remote provisioning server down to the wireless communication device and storing that information in an embedded identification unit.

One issue which has not yet been addressed by solutions known in the art is the situation that a wireless communication device is not capable of accessing servers outside the home cellular network. This is due to the fact that the wireless communication device has access limitations towards remote provisioning servers.

This is in particular true in cases that the wireless communication device is not capable of using packet switched connections. There are certain wireless communication devices i.e. emergency call devices which do not support packet oriented data communication at all. Another situation is that a wireless communication device is operating only within a virtual private network, either provided by the cellular network operator, as part of the IP multimedia subsystem (IMS) being part of 4G cellular networks, who disallows intraoperator access, or outside of the cellular network as part of a company network.

That means the known methods for remote provisioning service rely on built-in data communication functionality and capability of the wireless communication device. Furthermore in known methods the communication unit requires having the appropriate data communication method i.e. TCP/IP or UDP capabilities for supporting remote provisioning even when this functionality is not used by the wireless communication device for normal operation. In addition the existing TCP/IP functionality may not be accessible under all circumstances, i.e. bound to customer application. As a consequence many wireless communication devices are not able to access a remote provisioning server or can only follow the built-in functionality required today at high costs.

It is therefore a goal of the present invention to allow performing remote provisioning for those wireless communication devices that are not capable to access servers for remote provisioning outside the home cellular network.

A further goal is the reduction and optimization of the required built-in functionality of the wireless communication device.

SUMMARY OF THE INVENTION

In this respect the present invention aims to reach the addressed goal by a method for downloading subscription information according to claim 1. It also relates to an identification unit according to claim 10. Further the invention relates to a wireless communication device according to claim 12 and a cellular network according to claim 13. Finally it relates to a system according to claim 15.

It is therefore according to a first aspect of the invention proposed a method for downloading subscription information to an identification unit connected to a wireless communication device operating within a cellular network, said cellular network comprising at least one packet gateway node, at least one remote provisioning server (RPS) being connected to the packet gateway node, the remote provisioning server comprising a provisioning database, the wireless communication device operating in a mode with limited access to the remote provisioning server within the cellular network, the method comprising the steps:

submitting a request comprising an authentication identifier and access information relating to one remote provisioning server from the identification unit on an assigned communication channel to the cellular network, receiving at the cellular network said request from the identification unit, forwarding at the cellular network said request using a connection tunnel preconfigured according to said access information from the packet gateway node to the remote provisioning server addressed by said access information, upon reception of said request determining subscription information in the provisioning database based on said authentication identifier at the remote provisioning server, providing a response message comprising data relative to subscription information through said preconfigured connection tunnel to the identification unit, when subscription information detected, upon reception of said response message creating based on received data relative to subscription information an identity record and storing said created identity record in memory means of the identification unit.

According to the proposed method the wireless communication device is operating in a cellular network. Such a wireless communication device consists preferably at least of a controlling unit, a communication unit, at least one identification unit and an antenna.

The identification unit is dedicated to securely store authentication information for accessing a cellular network. The identification unit preferably further comprises a controller, which is a processing unit capable of executing commands preferably based on software libraries stored in the memory means.

Cellular networks resp. its radio access networks comprise at least two base nodes that supply a cell area with connectivity to the cellular network. Further the cellular networks internally provide preferably additional components, in particular at least one radio access network (RAN) and a core network CN.

The core network CN comprises at least one packet gateway node. This packet gateway node provides the connection to a couple of servers outside of the cellular network, including servers being part of the world wide web, further servers in a company network, and/or at least one remote provisioning server (RPS).

The servers of the world wide web are as such accessible by wireless communication devices supporting IP communication. The wireless communication devices address them by addressing requests to the internet internally to an Access Point Name (APN). The core network matches this APN to the packet gateway node, which comprises at least one access point. The packet gateway node is capable of accessing respective servers by an IP address which is addressed directly from the wireless communication device. This means, with each access to a webpage, the wireless communication device needs two addresses, typically in form of uniform resource locators (URL): the APN address and the web address.

Generally the same is true for access to all other servers accessible via the packet gateway node.

The inventive method is applicable to wireless communication devices operating in a mode with limited access to the remote provisioning server, as set out above. That means that there is no direct way for the wireless communication device to access with the packet gateway node the remote provisioning server. This is due to access limitations of the wireless communication device, which result from various reasons, as set out above. These access limitations do not allow a remote provisioning of those wireless communication devices, even if the remote provisioning server is known, certified and well-secured due to being situated in the domain of the cellular network operator.

By providing a connection tunnel the invention enables the identification unit via the wireless communication device to send a remote provisioning request to a remote provisioning server directly despite the access limitations.

Thus the inventive method starts with submitting a request from the identification unit to the cellular network on an assigned communication channel which is always available even in the above mentioned cases.

According to known cellular communication standards there is for identification units, in particular SIMs or UICCs, a direct connection to cellular network components. This is in particular true for the Bearer Independent Protocol. This allows from an identification unit to establish an assigned communication channel to a server within the cellular network, irrespective of the mentioned access limitations.

The request according to the invention comprises in particular an authentication identifier and access information addressing one remote provisioning server. Those sets of information are preferably stored in memory means of the identification unit. Each identification unit comprises memory means in order to provide the capability to store various sets of information. The sets of information in question are preferably preconfigured from the provider of the identification unit, which is preferably a cellular network operator.

The authentication identifier is an identifier which will deliver information to the remote provisioning server about the identity of the identification unit, and its owner respectively.

The access information comprise all information that are required to route the request through the cellular network and potentially attached networks, like the internet, in order to access the remote provisioning server.

In the next step the cellular network, respectively the addressed component of it, receives the request from the identification unit. The addressed component is in particular the packet gateway node.

Out of the mentioned access limitations it is generally not possible for the wireless communication device to access a remote server outside of the cellular network through an available communication channel. Therefore, according to the invention, it is proposed for the cellular network that it comprises at least one connection tunnel—preconfigured according to the access information—from the packet gateway node to at least one remote provisioning server.

By the provided access information the cellular network gets informed about the fact a) that a remote provisioning server outside of the access limitations needs to be accessed and b) which one is to be selected, in case more than one exists.

Such preconfigured connection tunnel is then used according to the invention, preferably by the packet gateway node, to access the remote provisioning server.

At the remote provisioning server the request is analyzed for retrieving the comprised authentication identifier. With this authentication identifier it is searched in the provisioning database for subscription information for the wireless communication device.

Provided no appropriate data set is found in the provisioning database, there are two options: the one is to respond to the request with a message comprising an error code indicating the rejection of the request. The other option is to suppress any answer. The requesting party—either the cellular network component or the identification unit—figures out the failure of the authentication by timeout.

If appropriate an appropriate data set with requested subscription information is found in the provisioning database, the subscription information is returned through the preconfigured connection tunnel of the cellular network to the identification unit in a response message. Typically the subscription information is coded into the response message as data relative to the subscription information. That means they are stored in compact form, and only those information sets are provided that are required for operating the wireless communication device under this subscription. Said subscription information in particular comprises access and/or service credentials like subscription identifier, shared secrets, keys and/or certificates.

Once the response message is received at the identification unit, the data relative to subscription information are retrieved from the response message. From the subscription information the identification unit then creates an identity record and stores this identity record in the memory means of the identification unit. The identity record is preferably stored that way that the wireless communication device is configured to operate in the cellular network by means of said identification unit under the subscription of this identity record. Typically such identification units have special memory means and flags who indicate which identity records are available for use. The wireless communication device then has the possibility to access the identification unit and receive information about such identities represented by an identity record, which is usable for authenticating at the respective cellular network.

It becomes apparent that by joint efforts of the identification unit with the cellular network through the wireless communication device, the addressed goal is reached. It is further advantageous that for reaching that goal the existing components on both sides of the air interface can be reused without remarkable modifications.

In a preferred embodiment it is proposed a method wherein the access information is stored in the memory means of the identification unit, the access information further addressing one of a plurality of access points situated at the packet gateway node, the addressed access point being dedicated for accessing the remote provisioning server by means of said connection tunnel.

With this embodiment it is defined for a packet gateway node one of a plurality of access points which is dedicated to access the connection tunnel to a predefined remote provisioning server. The access point is addressed by its access point name (APN), which is preferably part of the access information stored in the identification unit.

Depending upon the setup of the core network for each of the servers a special access point is defined. Alternatively the packet gateway node is addressed with one APN, and the different servers are discriminated by the server address.

This layout is advantageous as from the access information available in the identification unit it can already be decided that—despite the operation of the wireless communication device with access limitations—the connection to the remote provisioning server is established by means of the connection tunnel from this special access point of the packet gateway node to the remote provisioning server. With the availability of other access points within the packet gateway node, the normal behavior—e.g. for accessing company servers reachable in a VPN—is not affected.

According to another advantageous embodiment it is proposed that said access information is suited to allow access to the remote provisioning server by means of more than one addressed access point being part of at least one cellular network.

With this embodiment it is possible to access the remote provisioning server from different cellular networks by means of access information addressing a respective access point in the specific cellular network with the same access point name (APN) in particular due to a regulation rule. Alternatively by regulation definition a certain subdomain or top level domain can be defined which has to be routed through said connection tunnel to respective remote provisioning servers.

Preferably the mapping tables of the different cellular networks resolve the standardized APN to internal access points, typically reachable by an IP address. Thus it is assured that regardless of the cellular network the wireless communication device is operating in, the remote provisioning server is reached by the wireless communication device comprising an identification unit carrying the standardized access information.

In a further preferred embodiment it is proposed that said addressed access point is configured to allow access to the remote provisioning server by means of more than one cellular network.

According to that an access point is accessible from more than one cellular network, which in particular comprises access by different RANs of the same operator as well as cellular networks from different operators. This is in particular advantageous in roaming scenarios.

With these described embodiments, remote provisioning servers accessible by the current and at least one additional cellular network are addressable through the APN. This allows downloading subscriptions from outside of cellular networks.

In a further preferred embodiment it is proposed a method wherein the identification unit comprises upon start-up at least one initial identity record, and said initial identity record is dedicated for accessing the remote provisioning server.

This advantageous embodiment comprises one option about the initial setup of the identification unit. Basically to access the cellular network and its components, in particular the addressed access point/packet gateway node, the identification unit connected to the wireless communication device needs to provide a subscription which entitles the wireless communication device to access the cellular network. If it is the initial plan to download the subscription the wireless communication device is dedicated to operating with, it is suggested to equip the identification unit with the identity records of an initial subscription for the current cellular network.

Further it is suggested a method wherein the wireless communication device operates within the cellular network under a first subscription represented by a first identity record being stored in said memory means of the identification unit, comprising the step of: after storing said created identity record, hereinafter second identity record, switching from the operation within the cellular network under the first subscription to an operation within a cellular network under a second subscription, being represented by said second identity record.

Independent of what kind of first subscription—be it a full subscription or an initial subscription—it is according to this embodiment suggested to perform a switch to the second subscription based on the downloaded subscription information from the remote provisioning server. Depending on the type of first subscription, capabilities of the identification unit and general use case it is proposed to replace or keep the first subscription.

In case of an initial subscription it is advantageous to replace it, as this initial subscription is only needed at the start-up phase. Now with a downloaded working fully fledged subscription there is generally no need to keep an initial subscription. However in case the initial subscription has special access rights—e.g. to certain remote provisioning servers via said connection tunnel—not available for the second subscription, it is preferable to keep it.

Preferably a replacement of the first subscription is not done before it was not confirmed that a connection with a cellular network was successfully established using said second subscription.

In case the first subscription is a fully fledged subscription, its further handling is depending on the purpose of the identification unit. If the identification unit, in particular an UICC, is configured to maintain multiple identities and allows switching between both, it is advantageous to maintain also the first subscription. It is encompassed in this embodiment and part of the capabilities of the wireless communication device if such a switching is done based on user interaction with the wireless communication device, or done automatically.

A switching done automatically is according to another preferred embodiment proposed in a method comprising the step of after switching to an operation within a cellular network under a second subscription, switching back to an operation under the first subscription upon detection of an event out of the group of:
- a timer having expired,
- manual command being entered, and/or
- a signal quality indicator reaching a predefined threshold.

According to this preferred embodiment the first subscription is maintained. After a switch to the second subscription following the download of the subscription data is done, it is checked for a certain event that triggers a switch back to the first subscription. Generally subsequent switching between the first to the second subscription is governed according to this embodiment by the same group of events as defined above for the switch back.

In a further preferred embodiment it is suggested a method wherein the wireless communication device further comprises basic packet based communication protocol means, and said identification unit comprises a controller comprising advanced packet based communication protocol means by using said basic packet based communication protocol means provided by wireless communication device, said method comprising: submitting said request by means of said advanced packet based communication protocol means.

This improvement relates to wireless communication devices that are per se not equipped for packet based communication. This is in particular the case for emergency call boxes according to the EU eSafety Initiative. Those boxes typically comprise a communication module which is dedicated for the required communication means of the emergency call. This is circuit switched communication, which means all communication is voice based.

Nevertheless there might be the need to conduct remote provisioning also for wireless communication devices equipped like described. As remote provisioning as described above requires a TCP/IP data communication there is a need for a solution how to enable such wireless communication devices to carry out a remote provisioning session without those capabilities.

Here comes this embodiment into the play. It considers that the wireless communication device, in particular its communication unit, provides basic packet based communication protocol means. Those basic packet based communication protocol means preferably comprise different communication protocol means.

Based on this capability of the wireless communication device it is proposed that the identification unit is enabled to conduct advanced packet based communication protocol means, in particular TCP/IP or UDP.

As such the identification unit launches an IP request to the cellular network and the APN in order to reach a remote provisioning server via the connection tunnel preconfigured according to specified access information.

A first advantage of the described method is that a low-end—which means cheaper—communication unit is usable for such a wireless communication device. A second advantage is that the identification unit usually already provides additional security measures for conducting such advanced packet based communication protocol means.

As such the identification unit provides already tamper resistance. So it covers the advanced packet based communication and further provides the handling of the downloaded identities, which is an area where it would need massive efforts to prevent fraud actions as long as it is handled by the wireless communication device.

In another preferred embodiment it is suggested a method wherein the wireless communication device is configured to provide inband modem functionality, and the controller of said identification unit is configured to access said inband modem functionality for assigned communication channel based communication, said method comprising: conducting said request by means of said inband modem functionality using said assigned communication channel.

This preferred embodiment relates in particular to wireless communication devices with communication units capable to provide inband modem functionality, which is in particular true for emergency call capable communication units, as set out above.

The proposed method relates to the assigned communication channel between the identification unit and the cellular network. Such assigned communication channel is basically the bearer independent protocol (BIP). With the assigned communication channel the identification unit is enabled to contact the cellular network, in particular a packet gateway node of the cellular network, the wireless communication device is currently operating in. Generally it would be a problem to access a packet gateway node with a remote provisioning request via BIP if the wireless communication device is not or not fully capable of supporting packet based communication. According to this embodiment it is proposed to underlie the assigned communication channel, in particular the bearer independent protocol with inband modem functionality of the wireless communication device. By doing so, it is then possible to allow the identification unit, in particular when equipped with the appropriate protocol capabilities, to access the packet gateway node with remote provisioning requests via the assigned communication channel. This allows carrying out remote provisioning even for wireless communication devices equipped with cheap communication units which are only dedicated for emergency call purposes.

This is in particular advantageous as many cars are proposed to be equipped with emergency call units comprising such cheap communication units, and where later the car owner might want to enable the emergency car unit to conduct also other services, which would be executed by remote provisioning. The proposed embodiment is dedicated to fulfill such requirements.

According to another preferred embodiment it is proposed a method wherein the cellular network comprises more than one connection tunnel, said method comprising the steps:
prior to the step of forwarding said request, selecting the respective connection tunnel to the remote provisioning server based on said access information at the cellular network, and executing said preconfiguring step of a connection tunnel referring to said selected connection tunnel.

This embodiment bases on the situation where a cellular network comprises more than one connection tunnel. Hence it needs to solve the problem to select the right connection tunnel to the respective packet gateway node. According to that, the access information comprises selection information which indicates to the cellular network which connection tunnel is to be selected. One option for doing so would be to select a certain address of the packet gateway node, in particular an APN. If for the packet gateway node it is only possible to access one remote provisioning server from the identification unit by one connection tunnel, the selection would be non-ambiguous. Other measures like a direct identifier for a connection tunnel are also encompassed by this embodiment.

The proposed solution is advantageous as it lays the selection in the hands of the identification unit. As the identification unit already stores the access information for the remote provisioning server, the selection information for at least one cellular network is preferably additionally added.

It is further advantageous to store more than one selection information within the identification unit. These would be assigned to different cellular networks the identification unit is supposed to be operating in, in particular all cellular networks of a country. When the identification unit figures out in which cellular network it is currently operating, it is able to pick the appropriate selection information and select the right access point name depicting an access point in the packet gateway node linked to the connection tunnel for conducting a remote provisioning request within this respective cellular network.

According to a second aspect of the invention it is proposed an identification unit capable of being connected to a wireless communication device, the identification unit comprising a controller and memory means storing an authentication identifier and access information relating to one remote provisioning server, the controller of the identification unit is configured to:
  submit a request comprising the authentication identifier and access information on an assigned communication channel of the cellular network through a connection tunnel preconfigured according to said access information to a remote provisioning server,
  receive data relative to subscription information from the remote provisioning server through the preconfigured connection tunnel,
  create an identity record based on received subscription information,
  store created identity record in said memory means.

In this second aspect the identification unit plays the active role in requesting for subscription information from the remote provisioning server. It shares the advantages of the method according to the first aspect of the invention.

In a preferred embodiment it is proposed that, when the connected wireless communication device comprising basic packed based communication protocol means, that the identification unit comprises advanced packet based communication protocol means using said basic packet based communication protocol means,
  and the controller is configured to
  submit said request by means of said advanced packet based communication protocol means.

Here the identification unit is equipped with advanced packet based communication protocol means based on basic packed based communication protocol means from the connected wireless communication device. Such advanced packet based communication protocol means are in particular implemented by way of software packages or libraries which are capable to be run on the controller of the identification unit.

According to a third aspect of the invention it is proposed a wireless communication device for operating in a cellular network,
  said wireless communication device is configured to connect to an identification unit according to claim 10 or 11, further configured to
  operate within the cellular network under a first subscription represented by a first identity record stored in memory means of the identification unit,
  operate in a mode with limited access to a remote provisioning server within the cellular network,
  switch from the operation within the cellular network under the first subscription to an operation within a cellular network under a second subscription being represented by a second identity record.

Such a wireless communication device is vested with access limitations and requires a connection to an identification unit as described before. However the identification unit makes use of a wireless communication device as proposed according to this aspect of the invention in order to be capable of fulfilling its tasks.

According to a fourth aspect of the invention it is proposed a cellular network for having wireless communication devices operating within, the cellular network comprising at least one packet gateway node, further comprising at least one remote provisioning server being connected to the packet gateway node, the remote provisioning server comprising a provisioning database, and the cellular network being connected to at least one identification unit by means of an assigned communication channel, the identification unit being connected to a wireless communication device, wherein the cellular network is configured to
  receive a request comprising an authentication identifier and access information from the identification unit,
  forward said request using a connection tunnel, preconfigured according to said access information, from the packet gateway node to the remote provisioning server addressed by said access information,
  provide data relative to subscription information from the remote provisioning server through said assigned communication channel to the identification unit.

The suggested cellular network shares the advantages of the first aspect of the invention.

It is providing at least one connection tunnel preconfigured according to said access information from the packet gateway node to the remote provisioning server. In particular the access information comprise an access point name (APN) addressing a certain access point of the packet gateway node which only allows accessing the connection tunnel.

Such a connection tunnel is dedicated to access a remote provisioning server known to the cellular network. Even though the remote provisioning server does not need to be physically situated within the cellular network, it is nevertheless viewed as part of the cellular network and therefore allows access from a limited access wireless communication device. It is preferably not possible to define at the wireless communication device resp. the identification unit any outside server, e.g. in the internet, and try to access them. This is in particular true, as such connection tunnel is dedicated to a remote provisioning server and/or a packet gateway node and/or an access point.

In a preferred embodiment of this aspect of the invention it is proposed a cellular network comprising more than one connection tunnel,
  wherein the cellular network is configured to
  after receiving said request, determine said access information from the request,
  select one out of the plurality of connection tunnels based on the access information,
  execute the preconfiguring step of the connection tunnel to a remote provisioning server based on said selection step.

This embodiment ties in the previously mentioned embodiment of the first aspect, according to that more than one connection tunnel is present in the cellular network. The cellular network now expects any type of identification for a remote provisioning request which connection tunnel is used from the packet gateway node to the remote provisioning server. The identification is in particular the access point name of one of the access points in the packet gateway node, which is linked to the respective connection tunnel.

With the identification received from the identification unit via the wireless communication device the cellular network is able to select the appropriate connection tunnel based on the provided access information and forward the remote provisioning request to the remote provisioning server by means of the connection tunnel.

In a fifth aspect of the invention it is proposed a system for downloading subscription information to an identification unit according to claims 10 to 11, configured to be connected to a wireless communication device according to claims 12, further comprising a cellular network according to claims 13 to 14, the system being configured to:

submit a request comprising an authentication identifier and access information relating to one remote provisioning server from the identification unit on an assigned communication channel to the cellular network, receive at the cellular network said request from the identification unit, forward at the cellular network said request based on a preconfigured connection tunnel to the remote provisioning server addressed by said access information, upon reception of said request find subscription information in the provisioning database based on said authentication identifier at the remote provisioning server, provide data relative to subscription information through said preconfigured connection tunnel to the identification unit, when subscription information is detected, upon reception of said subscription information create based on received subscription information an identity record and store said created identity record in memory means of the identification unit.

The system shares the advantages of the previous aspects of the invention.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
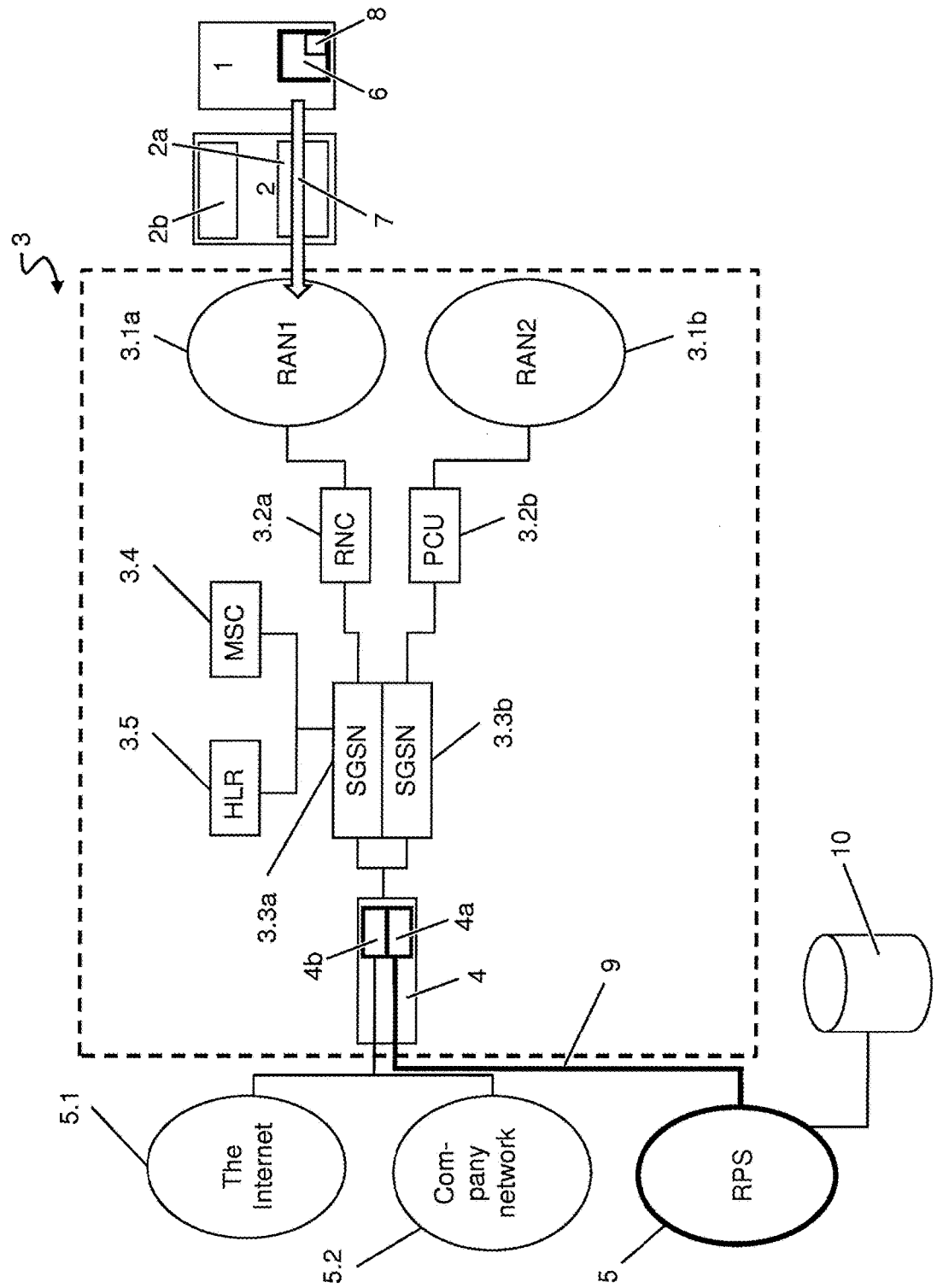
FIG. 1 represents an overview of the structure of an exemplary system.

The same elements have been designated with the same reference numerals in the different drawings. For clarity, only those elements and steps which are useful to the understanding of the present invention have been shown in the drawings and will be described. Moreover, when an action is said to be performed by a device or unit, it is in fact executed by a microprocessor in this device controlled by instruction codes recorded in a program memory on the said device.

FIG. 1 schematically shows an overview of an exemplary system according to the invention. It shows an identification unit 1 communicatively coupled to a wireless communication device 2. The wireless communication device 2 is operating in a cellular network 3. The wireless communication device 2 can be any kind of device capable of operating in a cellular network 3, including mobile handsets and so-called machine-to-machine (M2M) devices. In case of M2M devices, the invention is in particular applicable to those wireless communication devices 2 that are statically placed in an area with only rare human access, like a metering device.

Said cellular network 3 is preferably providing different radio access networks (RAN) 3.1a, 3.1b, implementing different cellular communication standards, like 2G (GSM, GPRS, EDGE), 3G (UMTS, WCDMA, CDMA2000, 1×RTT, etc.) or 4G (LTE, LTE advanced, etc.) as well as other wireless networks employing identification units with corresponding credentials. It is generally arbitrary in which of the radio access networks 3.1a, 3.1b the wireless communication device 2 is operating at the time of execution of the inventive method.

The wireless communication device 2 preferably comprises a communication unit 2a and a controlling unit 2b. The communication unit 2a is that unit of the wireless communication device 2 which performs all operation steps for carrying out the communication with the cellular networks 3, that is it preferably comprises the baseband chip, the protocol stack, high frequency radio components etc. The communication unit 2a is preferably implemented as M2M module, which already comprises all necessary components for communicating with cellular networks 3, and is controlled by the controlling unit 2b of the wireless communication device 2 by means of a command interface.

The controlling unit 2b is further preferably configured to facilitate means for user interaction, like input and/or output means, provide access to memory means within the wireless communication device 2 etc.

The identification unit 1 comprises memory means 6 for storing access information 8 for accessing a remote provisioning server 5. It is in particular removable, which is the case for subscription identity modules (SIM), and further embodiments thereof like an USIM, UICC etc. In case it is not removable it is preferably a machine-identification-module (MIM), which is soldered on a PCB of the wireless communication device 2. Such memory means 6 is preferably further configured for storing configuration information. The memory means 6 is in particular configured to store at least one identity record related to the subscription of the wireless communication device 2 in one cellular network 3.

The remote provisioning server 5 has access to a provisioning database 10 comprising subscription information allowing a wireless communication device 2 to operate in a cellular network, in particular the cellular network 3. The remote provisioning server 5 is accessible from the cellular network 3, in particular from a packet gateway node 4 through a connection tunnel 9. Other servers 5.1, 5.2 are accessible by the packet gateway node 4 as well, but not through connection tunnel 9.

The internal structure of the cellular network 3 as shown is a typical exemplary structure, comprising one or more RANs 3.1a, 3.1b, in particular UMTS, GSM/GPRS and/or LTE. The RAN side of the cellular network 3 comprises further components for each RAN, like a Radio Network Controller 3.2a and/or a Packet control unit 3.2b. In the cellular networks 3 core network further components like the Serving GPRS Support Node SGSNs (3.3a, 3.3b), the home location register HLR (3.5) and the Mobile Switching Center MSC (3.4) are present. Some of the components only exist in a subset of RANs supporting said cellular communication standards, or alternative components of the RANs fulfill their tasks.

The core network CN comprises additionally a packet gateway node 4. Such packet gateway node 4 is depending upon the supported cellular communication standards a Packet Data Network Gateway (PDN-GW) for LTE capable core networks, or a Gateway GPRS Support Node (GGSN). The packet gateway node is connected to the SGSNs 3.3a, 3.3b and receives requests from a wireless communication device 2 through this path. Alternatively the packet gateway node 4 and the SGSN 3.3a, 3.3.b can reside in the same component.

The packet gateway node 4 comprises at least one access point 4a linked to the connection tunnel 9 and preferably at least one further access point 4b linked to outside servers, like the internet 5.1 or a company network. In another embodiment it is foreseen that the access points 4a, 4b are situated in physically separated components, in particular in separate packet gateway nodes 4. The access rights of the wireless communication device 2 for this at least one further access point 4b is governed by access limitations of the wireless communication device 2. Reasons for these access limitations are in particular that the wireless communication device 2 is operating only in a virtual private network (VPN). Such a virtual private network is a secured access to a certain private control server, which handles and controls all access to outside servers. Out of security reasons it is be expected that the private control server inhibits the access to any outside servers resp. the internet. Therefore there is for the wireless communication device 2 neither access to outside servers (5, 5.1, 5.2) on the way to the private control server, nor from the private control server. From the security perspective this situation is exactly as envisaged in order to prevent wireless communication devices 2 to be infected by malware or other fraud mechanisms through access to uncontrolled infected servers.

The virtual private network (VPN) is in certain embodiments alternatively available within the cellular network. VPN functionalities within cellular networks are in particular available with cellular networks supporting LTE. As such, the wireless communication device 2 might even not actively be operating in a VPN, as it is provided by the cellular network 3.

Preferably the wireless communication device 2 is operating based on an initial subscription provided by the identification unit 1. Such initial subscription is preferably a limited subscription. This means e.g. that no voice calls are possible, preferably except emergency calls, and packet based connections to other servers than remote provisioning servers are limited. It is thus only dedicated for accessing a remote provisioning server.

The communication from the identification unit 1 for submitting a request is carried out through an assigned communication channel 7, which is preferably transparent for the wireless communication device 2. A typical implementation for such an assigned communication channel 7 is the bearer independent protocol (BIP). According to TS 102 223 (V.9.0.0) for this preferably a data channel from the UICC is opened to the wireless communication device, and through the wireless communication device 2 to a remote server in the cellular network 3. For the identification unit 1 it is transparent on which ways this assigned communication channel 7 to the cellular network 3 is established but it is needed to be available to implement the invention. On the other hand for the wireless communication device 2 the data exchanged between the identification unit 1 and the remote provisioning server 5 in the cellular network 3 are transparent.

Through the assigned communication channel 7 the identification unit 1 is configured to submit requests to the cellular network 3. In the exemplary embodiment such a request is handled by the RAN 3.1a and forwarded through the components RNC 3.2a and SGSN 3.3a to the packet gateway node 4.

The packet gateway node 4, in particular the access point 4a, is addressed by the access information 8, which is preferably done by an APN being matched by means of a mapping table of the cellular network 3 to the access point 4a of the packet gateway node 4. From the packet gateway node 4 the request is analysed and based on the access information 8 submitted with the request to an addressed remote provisioning server 5 by means of the preconfigured connection tunnel 9.

Upon reception of the request at the remote provisioning server 5, a search is carried out on the provisioning database 10. The search is preferably equipped with the received authentication identifier. In case the authentication identifier is found in the provisioning database 10, assigned subscription information is determined and the remote provisioning server 5 creates a response message comprising the subscription information.

The response message is submitted through the same connection tunnel 9 to the packet gateway node 4. From there it is forwarded through the appropriate components of the core network and the radio access network 3.1.a of the current cellular network 3, on the assigned communication channel 7 to the identification unit 1.

In the identification unit 1, preferably by means of its controller, an identity record is created based on the received subscription information and stored in the memory means 6 of the identification unit 1.

Preferably after the step of storing the identity record in the memory means 6 a switch of the subscription is carried out. This is either done manually based on user interaction or automatically.

Such automatically switching is preferably based on a plurality of events. Such an event is as first option a timer based event. That is used for temporary changes of subscription, in particular when the first subscription is the main subscription and the second one is only entitled for executing remote provisioning requests.

The second event is a manual command from user interaction, as mentioned above. Such a user interaction is preferably supported by any indication regarding quality of network coverage, available services in the currently active subscription or other information, which might lead the user to switch to the other subscription.

Finally the third event is based on a signal quality indicator, which is an indicator describing the quality of the current connection to the cellular network. Such a signal quality indicator is in particular the available power in the current band, a quality of service value, rejections of RRC requests, or other failure indicators like a RLT event in the case of a 2G radio access network. If the signal quality indicator is reaching a certain threshold, e.g. the power is below a threshold or the amount of RLT events is above a threshold, the switch event is triggered.

Figure 2:
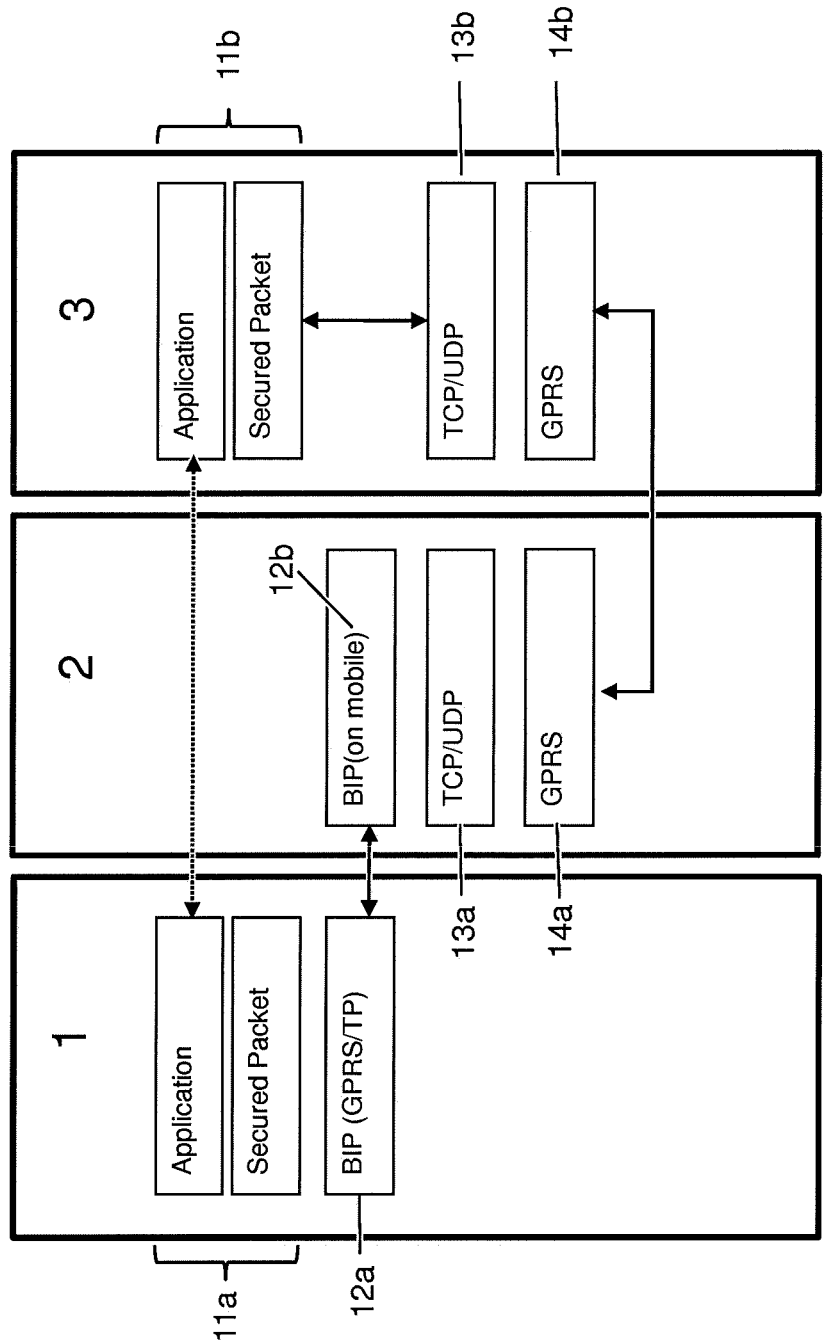
FIG. 2 represents a first layer structure of communication between identification unit, wireless communication device and cellular network.

In FIG. 2 it is shown one exemplary implementation of the layer structure for communication between the identification unit 1 and the cellular network 3, which is an implementation of the assigned communication channel 7. For this the identification unit 1 makes use of basic capabilities of the wireless communication device 2.

In the identification unit 1 the upper layer 11a comprises the application which is intended to supply secured packets to the cellular network 3. The security is achieved through cryptographic coding based on a mechanism agreed between the identification unit 1 and the cellular network 3. The involved wireless communication device 2 does not provide such an application layer and therefore has no means to decode the provided packets; it is thus transparent to the wireless communication device 2.

The identification unit 1 has the Bearer independent Protocol (BIP) layer 12a as communication layer. Data packets on the BIP layer are submitted to the wireless communication device 2 and sent to the cellular network 3 through underlying layers—here TCP/UDP 13a and GPRS 14a, but others are possible. Through the lower layers 14b and 13b, the cellular network 3 accesses the received packets at the application 11b for decoding the encrypted packet and handle it accordingly. The handling would then be based on an analysis of the data packet. If the data packet comprises a remote provisioning request with access information 8 denoting a remote provisioning server 5 accessible through a connection tunnel 9, then the cellular network 3 hands over the request to the packet gateway node 4. The packet gateway node 4 fulfills the access steps and returns the response from the remote provisioning server 5 through the denoted network components back to the identification unit 1, basically using the same way back as the initial request. The response includes an encoding as BIP data packet.

Figure 3:
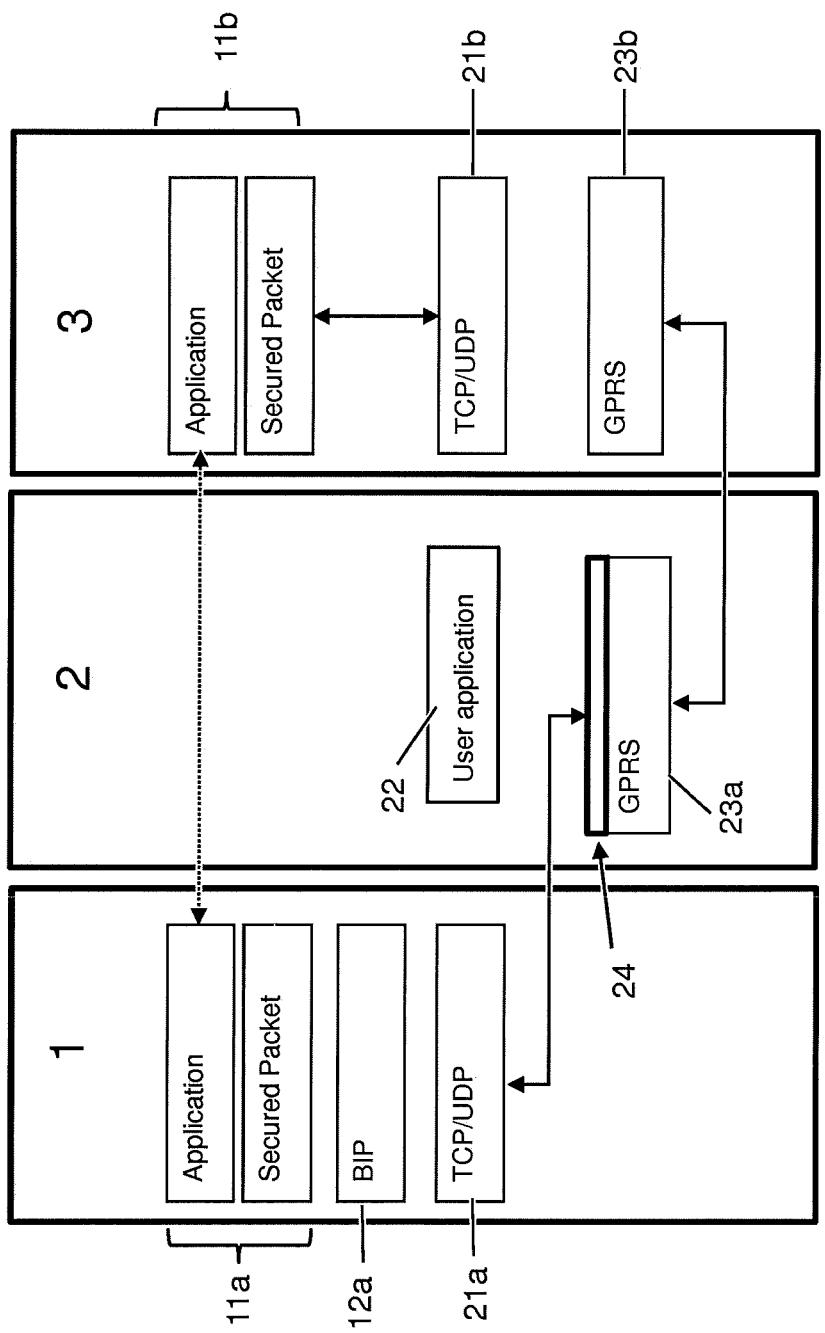
FIG. 3 represents a second layer structure of communication between identification unit, wireless communication device and cellular network.

FIG. 3 shows an alternative architecture to FIG. 2 which is applicable to low end wireless communication devices 2 that are not configured for packet based communication like TCP/IP. This architecture distinguished from the previous in that the BIP layer is based on an advanced packet based communication protocol means 21a in the identification unit 1. This is preferably implemented by an additional software library in the identification unit 1 supporting the BIP protocol layer. For doing so, the identification unit 1 preferably comprises a controller. This controller is capable of running software modules stored on the identification unit. Such modules are preferably libraries with the implementation of the particular protocol. These software modules make use of the basic packet based communication protocol means of the wireless communication device 2.

The advanced packet based communication protocol means 21a of the identification unit 1 now accesses basic packet based communication protocol means 24 provided by the wireless communication device 2. These basic packet based communication protocol means 24 are based on lower level communication layers 23a like GPRS. It further provides simple connection means. One preferred basic packet based communication protocol means is simple socket based communication. Sockets are a basic transportation scheme with communication primitives like open/close socket and send and receive commands. TCP/IP or UDP connections are based upon sockets. Other simple connection methods like Serial Line IP (SLIP) and Point-to-Point-Protocol (PPP), which are available for user application 22 of the wireless communication device 2, or other serial technologies are also encompassed by the basic packet based communication protocol means 24. On the cellular network side 3 the requests are accepted in a similar way compared to the previous architecture by a lower GPRS layer 23b and an advanced packet based layer 21b, here TCP or UDP. The options that a) a basic packet based layer is included in the advanced packet based layer 21b and b) separately implemented are both encompassed by present embodiment. The further handling within the cellular network 3 remains unchanged through this different architecture.

Figure 4:
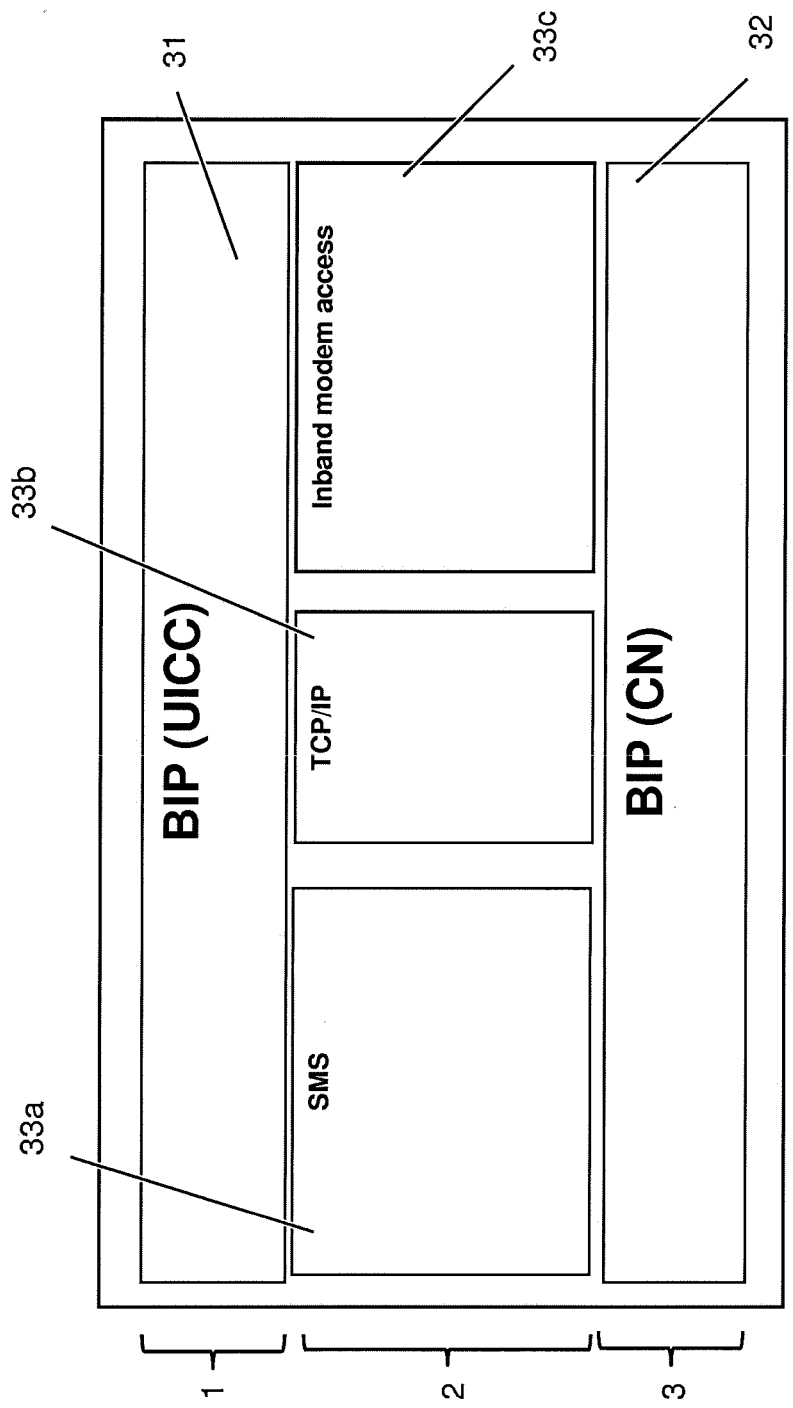
FIG. 4 represents options for implementing a bearer independent protocol.

In FIG. 4 different exemplary implementations of the bearer independent protocol according to embodiments of the invention are shown. The bearer independent protocol, as defined in ETSI TS 102 223, is for the identification unit 1 a protocol where it does not have to care about implementation details. With basic command primitives like OPEN/CLOSE CHANNEL, SEND and RECEIVE the identification unit 1 is able to send data to the cellular network 3 and receive a response. This is done by using BIP implementations at the identification unit 1, in particular the UICC 31 and the BIP Implementation of the core network 32 of the cellular network 3.

It is preferably based on the capabilities of the wireless communication device 2 which bearer is in fact used for transportation of the submitted data. In this exemplary embodiment various options are available: sending via SMS-bearer 33a, which is a basic functionality supported by all cellular networks fulfilling 2G or higher cellular communication standards. For more advanced RANs and wireless communication devices 2 a TCP/IP-bearer 33b as advanced packet based communication protocol means is available. Additionally another bearer is provided through embodiments of present invention, which is the inband modem access bearer 33c. Inband modem is a technology known for emergency call capable wireless communication devices 2, and is adapted for sending data and providing voice with one connection. For the emergency call use case, the data sending capability is used for sending relevant data of an emergency (the so-called minimum set of data MSD), like identity of the car, location co-ordinates, cause of the emergency etc.

In the proposed exemplary embodiment the inband modem capability is enhanced compared to the emergency call situation by also allowing a kind of inverse inband modem, as the cellular network 3 needs to be able to respond to a BIP request. For that the cellular network 3 is enhanced by inband modem sending capabilities, preferably on the same established connection as for the request from the identification unit 1. Additionally the wireless communication device 2 is enhanced by the capability to receive and understand inband modem messages on the established connection. Depending on the implementation and preconfiguration this capability is provided by the wireless communication device 2 itself or protocol libraries running on the identification unit 1.

It is dependent from the individual implementation how many bearers 33a, 33b, 33c for implementing the bearer independent protocol are available. The selection of the appropriate bearer is preferably based on criteria like tariffs, transmission rate requirements and subscription. In particular for the subscription, in the scenario of the remote provisioning, an initial subscription for executing remote provisioning will likely be limited to a certain transmission bearer and thus predetermines how the bearer independent protocol is executed.

From the foregoing it becomes apparent that the presented method solves the envisaged goal to overcome the disadvantages of the solutions known in the art, and it provides a reliable method for remote provisioning also for wireless communication devices with access limitations.

The invention claimed is:

1. Method for downloading subscription information to an identification unit connected to a wireless communication device operating within a cellular network,
   said cellular network comprising at least one packet gateway node,
   at least one remote provisioning server being connected to the packet gateway node, the remote provisioning server comprising a provisioning database,
   the wireless communication device operating in a mode with limited access to the remote provisioning server within the cellular network,
   the method comprising the steps:
      submitting a request comprising an authentication identifier and access information relating to one remote provisioning server from the identification unit on an assigned communication channel to the cellular network,
      receiving at the cellular network said request from the identification unit,
      forwarding at the cellular network said request using a connection tunnel preconfigured according to said access information from the packet gateway node to the remote provisioning server addressed by said access information,
      upon reception of said request determining subscription information in the provisioning database based on said authentication identifier at the remote provisioning server,
      providing a response message comprising data relative to subscription information through said preconfigured connection tunnel to the identification unit, when subscription information detected,
      upon reception of said response message creating based on received data relative to subscription information an identity record and storing said created identity record in memory means of the identification unit.

2. Method according to claim 1,
   wherein the access information is stored in the memory means of the identification unit,
   the access information further addressing one of a plurality of access points (4a, 4b) situated at the packet gateway node, the addressed access point (4a) being dedicated for accessing the remote provisioning server by means of said connection tunnel.

3. Method according to claim 2,
   wherein said access information is suited to allow access to the remote provisioning server by means of more than one addressed access point (4a) being part of at least one cellular network.

4. Method according to claim 2,
   wherein said addressed access point (4a) is configured to allow access to the remote provisioning server by means of more than one cellular network.

5. Method according to claim 1,
   wherein the identification unit comprises upon start-up at least one initial identity record, and said initial identity record is dedicated for accessing the remote provisioning server.

6. Method according to claim 1,
   wherein the wireless communication device operates within the cellular network under a first subscription represented by a first identity record being stored in said memory means of the identification unit,
   comprising the step of:
   after storing said created identity record, hereinafter second identity record, switching from the operation within the cellular network under the first subscription to an operation within a cellular network under a second subscription, being represented by said second identity record.

7. Method according to claim 6,
   the method comprising the step of
   after switching to an operation within a cellular network under a second subscription, switching back to an operation under the first subscription upon detection of an event out of the group of:
      a timer having expired,
      manual command being entered, and/or
      a signal quality indicator reaching a predefined threshold.

8. Method according to claim 1,
   wherein the wireless communication device further comprises basic packet based communication protocol means, and
   said identification unit comprises a controller comprising advanced packet based communication protocol means by using said basic packet based communication protocol means provided by wireless communication device,
   said method comprising:
   submitting said request by means of said advanced packet based communication protocol means.

9. Method according to claim 1,
   wherein the wireless communication device is configured to provide inband modem functionality, and
   the controller of said identification unit is configured to access said inband modem functionality for assigned communication channel based communication, said method comprising:
   conducting said request by means of said inband modem functionality using said assigned communication channel.

10. Identification unit capable of being connected to a wireless communication device,
    the identification unit comprising a controller and memory means storing an authentication identifier and access information relating to one remote provisioning server,
    the controller of the identification unit is configured to:
       submit a request comprising the authentication identifier and access information on an assigned communication channel of the cellular network through a connection tunnel preconfigured according to said access information to a remote provisioning server,
       receive data relative to subscription information from the remote provisioning server through the preconfigured connection tunnel,
       create an identity record based on received subscription information,
       store created identity record in said memory means.

11. Identification unit according to claim 10,
    wherein the connected wireless communication device comprising basic packed based communication protocol means,
    the identification unit comprising advanced packet based communication protocol means using said basic packet based communication protocol means,
    the controller is configured to
       submit said request by means of said advanced packet based communication protocol means.

12. Wireless communication device for operating in a cellular network, said wireless communication device is configured to connect to an identification unit according to claim 10, further configured to
- operate within the cellular network under a first subscription represented by a first identity record stored in memory means of the identification unit,
- operate in a mode with limited access to a remote provisioning server within the cellular network,
- switch from the operation within the cellular network under the first subscription to an operation within a cellular network under a second subscription being represented by a second identity record.

13. Cellular network for having wireless communication devices operating within,
- the cellular network comprising at least one packet gateway node,
- further comprising at least one remote provisioning server being connected to the packet gateway node, the remote provisioning server comprising a provisioning database,
- and the cellular network being connected to at least one identification unit by means of an assigned communication channel, the identification unit being connected to a wireless communication device,
- wherein the cellular network is configured to
  - receive a request comprising an authentication identifier and access information from the identification unit,
  - forward said request using a connection tunnel, preconfigured according to said access information, from the packet gateway node to the remote provisioning server addressed by said access information,
  - provide data relative to subscription information from the remote provisioning server through said assigned communication channel to the identification unit.

14. Cellular network according to claim 13 comprising more than one connection tunnel, wherein the cellular network is configured to
- after receiving said request, determine said access information from the request,
- select one out of the plurality of connection tunnels based on the access information,
- execute the preconfiguring step of the connection tunnel to a remote provisioning server based on said selection step.

15. System for downloading subscription information to an identification unit according to claim 10, configured to be connected to a wireless communication device, further comprising a cellular network,
the system being configured to:
- submit a request comprising an authentication identifier and access information relating to one remote provisioning server from the identification unit on an assigned communication channel to the cellular network,
- receive at the cellular network said request from the identification unit,
- forward at the cellular network said request based on a preconfigured connection tunnel to the remote provisioning server addressed by said access information,
- upon reception of said request find subscription information in the provisioning database based on said authentication identifier at the remote provisioning server,
- provide data relative to subscription information through said preconfigured connection tunnel to the identification unit, when subscription information is detected,
- upon reception of said subscription information create based on received subscription information an identity record and store said created identity record in memory means of the identification unit.

\* \* \* \* \*